Aug. 6, 1935.　　　　　J. A. SPENCER　　　　　2,010,649
CONTROL
Original Filed Nov. 4, 1932　　2 Sheets-Sheet 1

John A. Spencer,
Inventor

Aug. 6, 1935.  J. A. SPENCER  2,010,649

CONTROL

Original Filed Nov. 4, 1932   2 Sheets-Sheet 2

John A. Spencer, Inventor,
Delos G. Haynes, Attorney.

Patented Aug. 6, 1935

2,010,649

UNITED STATES PATENT OFFICE 2,010,649

CONTROL

John A. Spencer, Newtonville, Mass., assignor to General Plate Company, Attleboro, Mass., a corporation of Massachusetts Application November 4, 1932, Serial No. 641,150
Renewed June 25, 1934

18 Claims. (Cl. 200—140)

This invention relates to electric switches, and with regard to certain more specific features, to electric switches adapted either for thermostatic or pressure control.

Among the several objects of the invention may be noted the provision of a switch of the class described which is quick in action and responsive, within close limits, to critical temperatures or pressures; a switch of the class described which is adapted particularly for use as a heating medium thermostatic control in residence heating installations, and, as such, is responsive not only to ambient temperature changes within the residence, but also, to a certain extent, responsive to temperature changes exterior of the residence; a switch of the class described which may readily be used to control both temperatures and pressures, at the same time; and a switch of the class described which is relatively simple in construction and operation and involves but a minimum number of moving or wearing parts. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a front elevation of a switch embodying the present invention;

Figure 3:
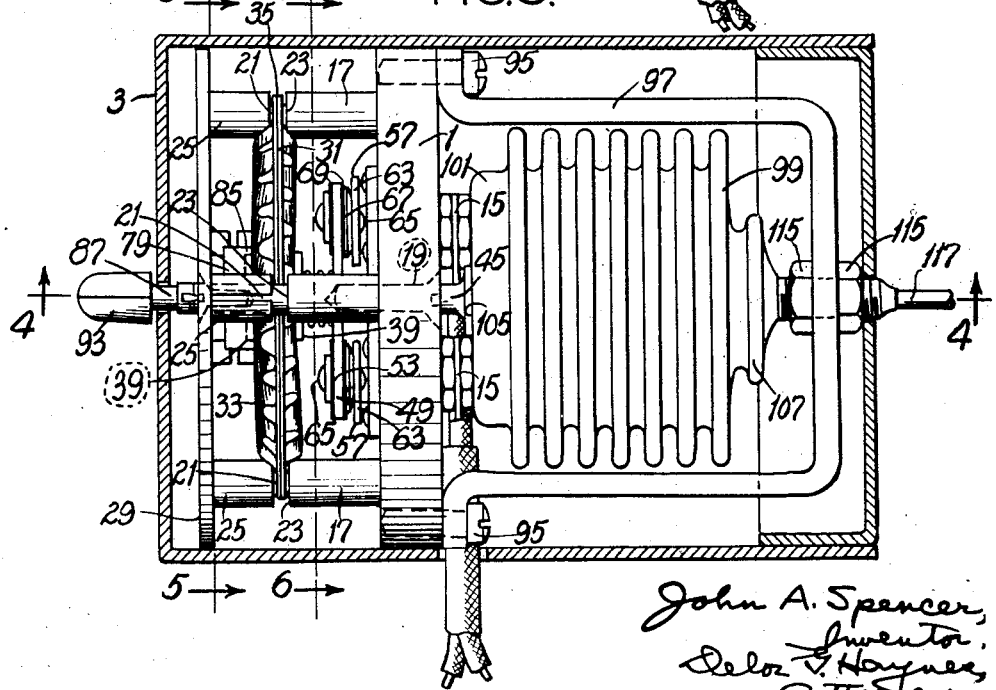
Fig. 3 is a top plan view of the switch shown in Fig. 1.
Figure 5:
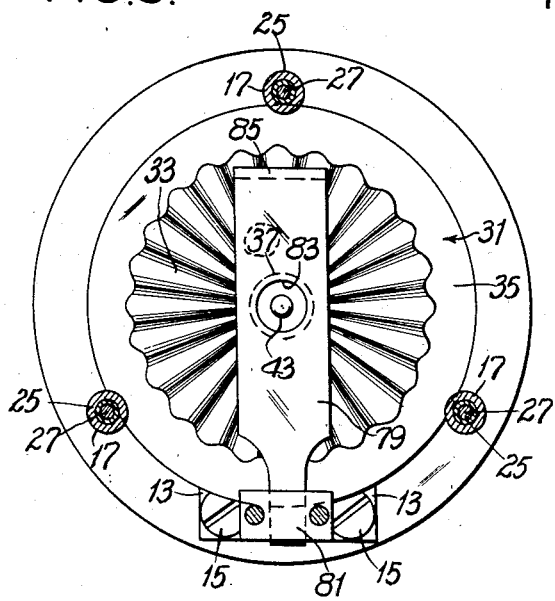
Figure 6:
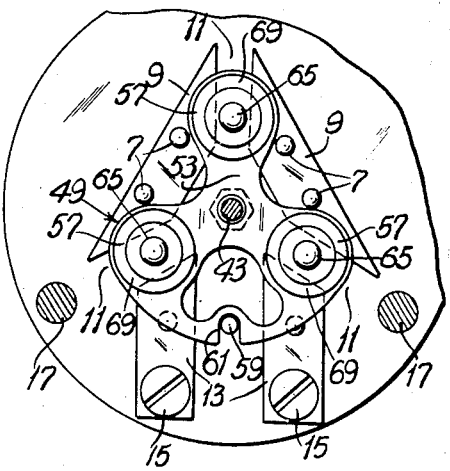

Figs. 5 and 6 are vertical cross sections taken on lines 5—5 and 6—6 of Fig. 3, respectively.

Similar reference characters indicate corresponding parts throughout the several views of the drawings.

In my copending patent application Serial Number 516,042, filed February 16, 1931, now Patent No. 1,895,591, dated January 31, 1933, I have shown an improved form of thermostat, which, for its size, has a greatly increased throw or travel between its cold and hot positions, and has improved thermal response characteristics. In my copending patent application, Serial Number 653,702, filed January 26, 1933, now Patent No. 1,972,172, dated September 4, 1934, the principles of said thermostat are applied to a non-thermostatic overcentering device, which has the same advantages, relatively, as the thermostat. It is a principal object of the present invention to embody, or provide for the embodiment of, such improved thermostat or overcentering device in an electric switch, particularly such a switch as adapted for household or room temperature control, or pressure control generally. When the switch is used as a temperature control, it is desirable, first, that the operating differential of the thermostatic switch be reduced to a minimum, and, second, that the switch be capable of adjustment whereby it operates at any desired temperature. When the switch is used as a pressure control, it is similarly desirable that the differential of the switch be reduced to a minimum, and that the switch be capable of adjustment whereby it operates at any desired pressure. The invention as hereinafter described meets all of these requirements, and in addition, presents numerous other advantages.

The invention will first be described in such an embodiment as employs a thermostat of the type shown in my said application Serial Number 516,042. Thereafter, the invention will be described in connection with the embodiment including a non-thermostatic overcentering device of the type shown in my application Serial Number 653,702.

Referring now more particularly to the drawings, numeral 1 indicates a base board, mounting panel or the like, upon which the invention is assembled. A casing 3 may be provided for the assembled device as a whole.

Figure 1:
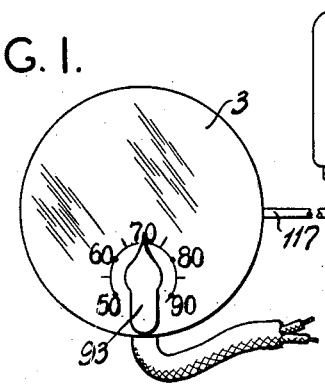
Figure 2:
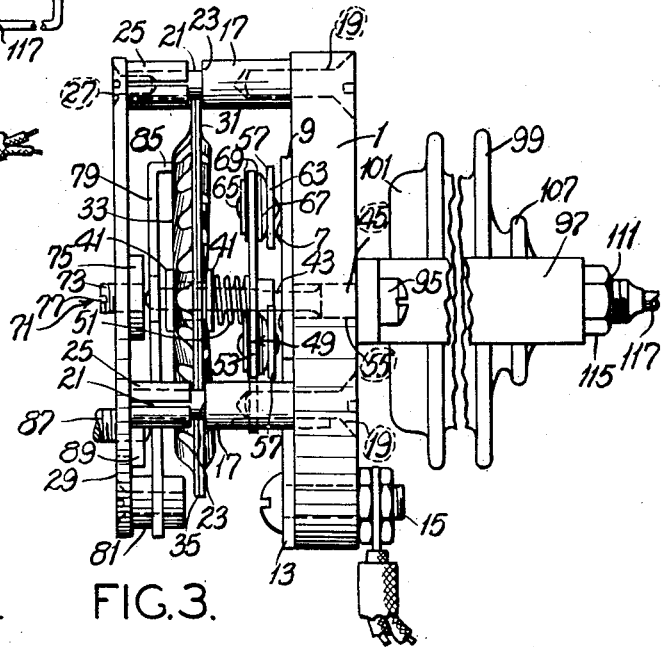
Fig. 2 is a side elevation of the switch shown in Fig. 1.

Mounted directly upon the base 1 (which, under these circumstances, is made of a suitable insulating material) as by rivets 7 are a series of contact plates 9 (Fig. 6), with gaps 11 therebetween. The two end plates 9, as indicated at numeral 13, constitute the terminals of the switch and are accordingly provided with suitable binding posts 15 (Figs. 1 and 2). The arrangement is such that three gaps 11 are provided between the two terminal plates 13. This number (three) is not arbitrary, but by way of example only.

Spaced at intervals of 120°, more or less, around the contact plate assembly, are three mounting or supporting pillars or columns 17. Machine screws 19 hold the columns 17 upright on base 1. The columns 17, toward their upper end, are provided with reduced-diameter portions 21, leaving shoulders 23 (Figs. 3 and 5). Sliding upon the portions 21 are collars 25. Mounted on top of the columns 17 by means of machine screws 27 is a circular face-plate 29.

Numeral 31 indicates a thermostatic element of the type disclosed and claimed in my said co-pending application, Serial Number 516,042. It comprises a disc of thermostatic metal (usually bimetal), the central portion of which is radially corrugated, as indicated at numeral 33, but the edge portion 35 whereof is flat or flattened. A central opening 37 is provided in the corrugated region 33 (Fig. 5). The disc as a whole is normally dished, or made slightly conical, in one direction. Normally, when the thermostat is to be used to turn on a circuit when the temperature drops to a predetermined value, the dishing is such that, at temperatures below said predetermined value, the metal layer of the thermostatic metal having the higher coefficient of thermal expansion is on the concave side of the disc.

The action of the thermostat 31 is such, that as temperature change occurs, past a predetermined value, the direction of curvature of the disc reverses itself with a snap. The fact is that when the temperature is rising, the snapping temperature is higher for the same thermostat, than the snapping temperature when the temperature is falling, the difference being termed the operating differential. For example, in the heating phase, a thermostat snaps from cold to hot position at 85° F., while the same thermostat, in the cooling phase, snaps from hot to cold position at 80° F., the difference (85°—80°=5°) being known as the operating differential of the particular thermostat.

Returning to the switch, the thermostat 31 is mounted on the columns 17, by its flat edge portion 35 abutting and being clamped against shoulders 23 by collars 25 and screws 27. This leaves the central portion 33 of the thermostat free to snap into its two opposite positions of curvature with temperature changes.

A pair of nuts 39 having cylindrical portions 41 extending into each side of the opening 37 of disc 31 are threaded on a shaft 43 extending transversely of the general plane of the thermostat. The nuts 39, which for all practical purposes mechanically interconnect shaft 43 and thermostat 31, are provided with the cylindrical portions 41 so that they do not bind or clamp upon, and hence alter the operating characteristics of the thermostat. On the shaft 43, beneath the thermostat disc 31 is rather loosely mounted, by nuts 47, a contact-bridging assembly 49. A compression spring 51, reacting at one end against a plate 53 of assembly 49, and at the other end against the lower nut 39, forces said assembly 49 always into its lowermost position, relative to the shaft 43.

The lower portion 45 of shaft 43 slides freely in a hole 55 of base 1.

The contact-bridging assembly 49 comprises the plate 53, which is usually circular, upon which are insulatedly mounted three contact buttons 57. The buttons 57 are preferably allowed a slight degree of motion on plate 53. The buttons 57 are so arranged that they bridge each gap 11 (Fig. 6) of the contact plates 9, so that, when one of them completes a circuit across its particular plates 9, the others do likewise and instantly establish an electrical connection between terminals 13. To keep the plate 53 from rotating, a pin 59 is rigidly mounted in base 1, and engages a slot or notch 61 in the edge of plate 53.

The buttons 57 each comprise (Fig. 5) a disc 63 of good conducting metal, held by a rivet 65 to disc 53. Also on the rivet 65 is a rounded plate 67, upon which the disc 63 rocks through a few degrees. Insulating material 69 electrically isolates disc 63 from disc 53.

The buttons 57 may well be made in accordance with the teachings of Spencer Patent 1,697,886. The contact plates 9, in turn, may well be made in accordance with the teachings of Marshall Patent 1,700,172.

As has been indicated, the thermostat 31 is subject to two adjustments: first, the adjustment of the operating differential, and, second, the adjustment of the temperature of operation, independently of the differential.

The differential adjustment is effected by means of a stop assembly 71, comprising a screw 73 and bearing 75 (Fig. 5) mounted in face plate 29. The end of shaft 43 is coaxial with screw 73, so that it abuts thereagainst. Inasmuch as differential control is usually a matter of factory adjustment, the only manipulative means shown for the screw 73 comprises a slot 77.

Figure 4:
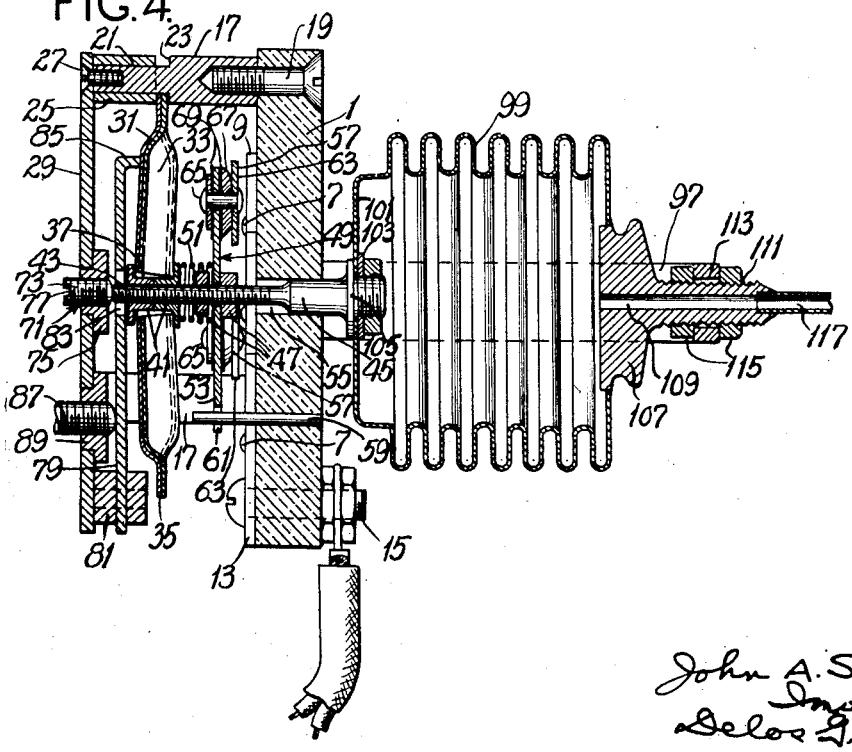
Fig. 4 is a vertical longitudinal section taken on line 4—4 of Fig. 3.

The temperature adjustment is effected by means of a spring lever 79, (Figs. 4 and 5) rigidly secured at one end in clamping blocks 81 held on the back-side of face plate 29. The lever 79 extends across the center of thermostat 31 (a hole 83 being provided to clear shaft 43 and screw 73), to engage the top face of thermostat 31 with a bent-over edge 85. Edge 85 engages the thermostat 31 at a point relatively near to the edge of the corrugated region 33. Engaging the lever 79 near its mounted end is a screw 87, borne in a suitable bushing 89 on face plate 29. By advancing the screw 87 inwardly, the lever is moved against the thermostat, and the resilient pressure brought to bear on the face of thermostatic disc 31 is gradually increased.

The screw 87 projects through cover 3 and is provided with a knob 93 having a pointer, which juxtaposes a suitable temperature scale formed on said cover 3 (see Fig. 1).

Mounted upon the back of base 1, by means of bolts 95, is a U-shaped frame 97. The frame 97 is sufficiently wide to accommodate a metallic or like bellows 99. The construction of the bellows 99 is well known and requires no detailed description. The closed end 101 of bellows 99 faces the back of base 1, and is bolted, as indicated at numeral 103 (Fig. 4) to the rear end 105 of shaft 43. The connection 103 is gas-tight.

The other end of bellows 99 includes a block 107, provided with a passage 109 leading therethrough. The end of block 107 is threaded as at numeral 111, and passes freely through a hole 113 in support 97. On each side of the support 97 is provided a nut 115, the two nuts 115 locking the end piece 107 in any desired position with respect to the frame 97. To the end of block 107 is attached a suitable connecting tube 117, which may lead to any means, the pressure of which is to be regulated. In the embodiment shown in Fig. 1, the tube 117 leads to a capsule 119, which contains a volatile liquid such as ether or the like which has a vapor pressure that varies to a considerable extent as the temperature changes.

It will be seen that as pressure increases or decreases within the bellows 99 the closed end 101 thereof tends to move backwards and forwards in response to the changing pressure, and thus exerts an influence on the shaft 43 tending to move it backwards and forwards on its own axis.

The operation of the switch as thus described is as follows, disregarding, for the present, the bellows arrangement 99:

Assuming that the thermostat 31 is in its cold position when dished outwardly (as in Figs. 3 and 5); the contacts are broken at gaps 11 by the lifted plate 53. The operating differential is now adjusted, presumably at the factory, by rotating screw 73 and thus, by the abutment of screw 73 and shaft 43, altering the extent of dishing of the thermostatic disc.

For example, with a thermostat 1½" in diameter, made of 0.015" thick bimetal (low expansion member, 36% nickel steel; high expansion member, nickel-chromium steel having 22% nickel and 3% chromium), upon careful adjustment the differential may be reduced to a total of 1° F., which is quite small enough to be unnoticeable in household use.

With the differential adjusted to minimum value, in the described thermostat, the separation between contact plates 9 and buttons 57, in off position may be as little as 0.015" and the switch will still carry as high as 6 amperes in a resistance load on a 150 volt D. C. circuit, or a 220 volt A. C. circuit. When the switch is thus open or off the spring 51, by balancing the plate 53, holds all buttons 57 off contact plates 9, although no damage is done if, due to vibration or the like, one of the buttons closes its respective gap momentarily, for all three gaps cannot at once be closed in this manner, and even one gap open is ample to withstand the applied voltage after the circuit has once been opened.

The temperature adjusting means, comprising the spring lever 79 and knob 93, etc., is next adjusted.

The position and flexibility of the spring lever 79 are important. When these are correct, the force exerted by the lever 79 will control the operating temperature successfully over a wide range, for example, from 50° to 90° F. If, however, the lever is too stiff, or if its point of contact with the thermostatic disc 31 is too near the center of said disc, its tendency will be to make the disc creep rather than to move with the desired snap action. If the lever 79 is too flexible, or if its point of contact with the thermostatic disc 31 is too near the periphery of said disc, its tendency will be to increase the operating differential to an undue extent. In connection with a thermostatic disc 1½" in diameter, a lever of spring steel of 0.025" thickness and the general shape and size indicated, relatively, in the drawings has been found satisfactory. Final adjustment of the point of contact of lever 79 with thermostat 31 may be effected by moving said lever in and out of clamping blocks 81.

The spring lever 79 in reality has two functions. First, it adjusts the operating temperature (that is, it adjusts the temperature at which the device operates). Second, it effects a reduction of the differential per se, independently of the temperature of operation. This latter effect is secured by reason of the fact that the force exerted by the spring lever 79 upon the thermostat 31, when the switch is open, is greater, for a given setting of knob 93, than when the switch is in closed position. The increment of force exerted by the spring lever, which comes into action when the thermostatic disc snaps, is always in such a direction as to oppose the motion, or, in other words, to favor the reverse motion. The reverse motion will therefore occur with a lesser temperature change than would be necessary were this increment absent, and hence the differential is reduced.

As has been indicated, upon suitable temperature change the thermostatic disc 31 reverses its curvature with a snap. Assuming that the reversal takes place from switch-open position (represented in Figs. 3 and 5) to switch-closed position, the following action takes place:

The moving central portion of the thermostatic disc 31 carries with it, by axial movement, the central shaft 43. Thus plate 53 of contact assembly 49 is moved toward the contact plates 9. Because of the rather loose engagement of plate 53 with shaft 43, the said plate 53 is permitted to rock a few degrees and each button 57 made to bridge its respective gap 11 with equal pressure (the circuit being thus completed).

When the thermostat again reverses its curvature, upon temperature change in the opposite (disconnecting) sense, the loose engagement of plate 53 with shaft 43, and the spring 51, all cooperate to permit a slight axial movement of shaft 43 before plate 53 is moved, so that when said plate 53 is moved, the action is a light hammer blow to disconnect buttons 57 and plates 9. The hammer blow is advantageous to minimize arcing, particularly as coupled with the series-break type of switch here employed.

The operation of the bellows 99 in conjunction with the foregoing operation is as follows:

Let it be assumed that the thermostat, for example, is mounted in juxtaposition to the water boiler of a house heating plant (or in juxtaposition to a hot air duct or the like). The tube 117 extends through the walls of the dwelling to the capsule 119, which is mounted exteriorly of the dwelling. Depending upon the exterior temperature, the vapor pressure of the ether or other volatile liquid in capsule 119 tends to expand or contract the bellows 99 and thus places more or less of a load upon the thermostatic element 31. When, for example, the exterior temperature is high, it is usually not necessary that the thermostat, which controls the household heating device, be adjusted to maintain the temperature of the heating medium at quite so high a value as when the exterior temperature is lower. When the exterior temperature is high, the vapor pressure in the bellows 99 is high, and this pressure reacts through the shaft 43, upon the thermostatic disc 31 in such manner that it tends to prevent said disc from snapping to its cold, or circuit-closing position. However, when the exterior temperature drops, the rate of cooling of the dwelling is higher, and it is desirable that the temperature of the heating fluid be higher, so that it may heat the dwelling more rapidly. Under these circumstances, it will be seen that the vapor pressure in the bellows 99 is low, thereby eliminating the pressure that, in the previous case, tended to resist the snapping of the thermostatic disc 31 to circuit-closing position. That is, in the event that the exterior temperature is low, the thermostatic disc 31 is permitted to respond more quickly to temperature changes of the heating fluid at its source than when the exterior temperature is high.

As thus described, the device is not used directly as a room-thermostat, but in conjunction therewith as a controller for the temperature of the heating medium itself, in turn to be controlled (as to time of operation) by the ambient temperature-responsive room thermostat.

It will be seen that this additional control feature provided by the bellows 99, in effect, has no bearing upon the differential adjustment (which is a relatively fixed abutment limiting the throw of the disc 31) provided by the screw 73. On the other hand, the bellows 99 acts only as a variable adjusting force against the snapping of the thermostatic disc 31, the variation being in response to another temperature change.

Regulation of the amount of force delivered by the bellows 99 may be effected by loosening the nuts 115 and moving the end piece 107 in or out of the frame 97.

In the invention as thus far described, the switch has been considered a purely thermostatic one, although pressure has been utilized as one element of the thermostatic control. It will be apparent that, by eliminating the capsule 119, and connecting the tube 117 to the source of pressure which it is desired to regulate, that the device becomes a combination temperature and pressure regulating system. In this case, the switch usually finds more use in connection with industrial purposes than in connection with household heating.

For example, let it be considered that the switch controls the heater of an electrically heated boiler. The thermostatic element 31 is suitably located to respond to the temperature of the boiler, and the tube 117 connects to the boiler in such a manner as to subject the bellows 99 to the boiler pressure. Under conditions such that the boiler is heating, and is below the desired control temperature and pressure, the switch will be closed. If, now, for some reason the pressure unduly increases, the pressure in bellows 99 will be sufficient to snap the thermostatic disc 31 over to circuit-breaking position, even though the temperature has not yet reached a high enough value to cause the thermostatic disc to snap solely in response thereto. Similarly, if the temperature increases somewhat above the pre-established limit, although the pressure has not yet done so, the temperature alone is sufficient to snap the disc 31 to circuit-breaking position.

With the switch thus used as a combination pressure and temperature regulating system, the knob 93 is used for setting the pre-established temperature value, while the nuts 115 are used for setting the pre-established pressure value.

The switch may also be used exclusively as a pressure control, disregarding the temperature control feature entirely. In this event, the thermostatic disc 31 is desirably replaced by a disc made in accordance with my said patent application, Serial Number 653,702. Such a disc has all of the outward characteristics of the thermostatic disc as described, with the exception that it is formed of but a single layer of spring metal, such as sheet brass or steel, in contrast to the thermostatic or bimetal employed when the device is to be temperature responsive. The single metal disc comprises an over-centering device, which is readily snapped from one to the other of its two stable positions by the application of exterior forces thereto.

With a non-thermostatic overcentering spring disc employed in the switch, the element of temperature response is no longer effective. However, the spring disc is subject to the same types of regulation as the thermostatic disc. For example, the screw 73 still controls the operating differential of the spring disc, through the adjustment of the motion-limiting abutment, although in this instance the differential is as between the pressure required to snap the disc from a first to a second position, and the pressure required to snap the disc back from the second to first position. Similarly, the spring lever 79, controlled by the knob 93, now regulates the operating pressure of the device in the same manner that it heretofore regulated the operating temperature, by providing a force aiding, in one sense, and opposing, in the other sense, the structural resistance of the disc to undergo movement or snapping. The lever 79 may thus be described, in both the temperature and the pressure responsive embodiments, as a means controlling the tendency of the disc to undergo snapping movement.

It will be understood that in the pressure control as thus described, the overcentering spring disc is responsive exclusively to pressure variations within the bellows 99. The bellows 99 is, of course, connected by the tube 117 to the source of pressure which it is desired to regulate.

Summarizing the invention, it will be seen that a control device is provided wherein there is a snapping element, which elements is provided with means for adjusting both its operating differential (temperature or pressure) and its operating value (temperature or pressure). In the further event that the device is used for regulating temperature, it embodies a means which is further, secondarily responsive to a distinct and different temperature condition, in addition to the temperature condition by which it is directly or primarily controlled.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A control device comprising a radially corrugated, snap-acting disc, means supporting said disc at the periphery thereof, means limiting the amplitude of movement of said disc, means controlling the tendency of said disc to snap, and pressure-responsive means arranged to apply a force to the movable portion of said disc.

2. A control device comprising a radially corrugated, snap-acting disc, means supporting said disc at the periphery thereof, means limiting the amplitude of movement of said disc, means controlling the tendency of said disc to snap, and pressure-responsive means arranged to apply a force to the movable portion of said disc, said last-named means comprising a bellows, and means connecting said bellows to the central, movable portion of said disc.

3. A control device comprising a radially corrugated, snap-acting disc, means supporting said disc at the periphery thereof leaving the central portion of said disc free to snap, means abutting the central portion of said disc to limit the amplitude of movement thereof, means bearing upon said disc between the said central and peripheral portions thereof and controlling the tendency of said disc to snap, and pressure-responsive means arranged to apply a force to the said central portion of the disc.

4. A control device comprising a radially corrugated, snap-acting disc, means supporting said disc at the periphery thereof leaving the central portion of said disc free to snap, means abutting the central portion of said disc to limit the amplitude of movement thereof, means bearing upon said disc between the said central and peripheral portions thereof and controlling the tendency of said disc to snap, and pressure-responsive means arranged to apply a force to the said central portion of the disc, said last-named means comprising a bellows, and means connecting said bellows to the central, movable portion of said disc.

5. An electrical switch comprising a radially corrugated, snap-acting disc, means supporting said disc at the periphery thereof leaving the central portion of said disc free to snap, stationary contact means, movable contact means operated by the central portion of said disc arranged to cooperate with said stationary contact means, means abutting the central portion of said disc to limit the amplitude of movement thereof, means bearing upon said disc between the said central and peripheral portions thereof and controlling the tendency of said disc to snap, and pressure-responsive means arranged to apply a force to the said central portion of said disc.

6. A switch as set forth in claim 5 in which the disc is formed of thermostatic material, whereby it is made responsive to temperature variations.

7. A switch as set forth in claim 5 in which the disc is formed of thermostatic material, whereby it is made responsive to temperature variations in the vicinity of said switch, and in which the said pressure-responsive means is in turn controlled by temperature-responsive means remote to the said switch.

8. A switch as set forth in claim 5 in which the said pressure-responsive means is the sole actuating means for said disc, whereby the said switch is responsive only to pressure variations.

9. A thermostatic electrical switch comprising a radially corrugated, snap-acting thermostatic disc, means supporting said disc at the periphery thereof, stationary contact means, movable contact means operated by said disc and positioned to cooperate with said stationary contact means, said thermostatic disc being directly responsive to temperature variations in the vicinity of said switch, and means controlling the operating characteristics of said thermostatic disc according to temperature variations remote to the said switch.

10. A thermostatic switch as set forth in claim 9 including, in addition, means for regulating both the operating temperature and the operating differential of the said thermostatic disc.

11. A thermostatic switch as set forth in claim 9, in which the last-named means comprises a bellows, a capsule, and a tube connecting said bellows to said capsule, said capsule containing a volatile liquid.

12. A pressure-responsive electrical switch comprising a radially corrugated, snap-acting over-centering disc, means supporting said disc at its periphery, stationary contact means, movable contact means operated by said disc and arranged to cooperate with said stationary contact means, means controlling the operating differential of said disc, and means controlling the pressure at which said disc snaps, and means applying the pressure to be controlled to the movable portion of said disc.

13. A pressure-responsive electrical switch comprising a radially corrugated, snap-acting over-centering disc, means supporting said disc at its periphery, stationary contact means, movable contact means operated by said disc and arranged to cooperate with said stationary contact means, means controlling the operating differential of said disc, and means controlling the pressure at which said disc snaps, and means applying the pressure to be controlled to the movable portion of said disc, said last-named means comprising a bellows operatively connected to the pressure to be controlled, and means connecting said bellows to the movable portion of said disc.

14. A pressure-responsive electrical switch comprising a radially corrugated, snap-acting over-centering disc, means supporting said disc at its periphery, stationary contact means, movable contact means operated by said disc and arranged to cooperate with said stationary contact means, means controlling the operating differential of said disc, and means controlling the pressure at which said disc snaps, and means applying the pressure to be controlled to the movable portion of said disc, said differential control means comprising abutments limiting the amplitude of movement of the central portion of said disc.

15. A pressure-responsive electrical switch comprising a radially corrugated, snap-acting over-centering disc, means supporting said disc at its periphery, stationary contact means, movable contact means operated by said disc and arranged to cooperate with said stationary contact means, means controlling the operating differential of said disc, and means controlling the pressure at which said disc snaps, and means applying the pressure to be controlled to the movable portion of said disc, said pressure control means comprising resilient means bearing upon the said disc between the central and the peripheral portions thereof.

16. An electrical switch adapted to respond to both temperature and pressure changes comprising a radially corrugated, snap-acting thermostatic disc, means supporting said disc at the periphery thereof leaving the central portion of said disc free to snap, stationary contact means, movable contact means operated directly by said central portion of said disc and arranged to cooperate with said stationary contacts, adjustable abutments limiting the amplitude of movement of said central portion of the disc and thereby controlling the operating temperature differential of said disc, an adjustable spring lever bearing upon said disc between the central and peripheral portions thereof and thereby controlling the operating temperature of said disc, and pressure responsive means, connected to a source of pressure to be controlled, operating directly upon the central portion of said disc, said disc being responsive to pressure variations in said last-named means independently of temperature variations.

17. A thermostatic electrical switch comprising a snap-acting thermostatic disc, means supporting said disc at the periphery thereof, stationary contact means, movable contact means operated by said disc and positioned to cooperate with said stationary contact means, said thermostatic disc being directly responsive to temperature variations in the vicinity of said switch, and means controlling the operating characteristics of said thermostatic disc according to temperature variations remote to the said switch.

18. A control device comprising a snap-acting thermostatic disc, means supporting said disc at one portion thereof, leaving another portion free for movement, and pressure-responsive means arranged to apply a force to the movable portion of said disc.

JOHN A. SPENCER.